United States Patent [19]

Erwin

[11] Patent Number: 5,149,953
[45] Date of Patent: Sep. 22, 1992

[54] DRIFT TRACKING IN AN ELECTRO-OPTIC LIGHT MODULATOR

[75] Inventor: James C. Erwin, Rochester, N.Y.

[73] Assignee: Eastman Kodak Company, Rochester, N.Y.

[21] Appl. No.: 632,812

[22] Filed: Dec. 24, 1990

[51] Int. Cl.$^5$ ................................. G01J 1/32
[52] U.S. Cl. .................................. 250/205; 250/225; 359/323
[58] Field of Search ............... 250/205, 225; 346/108, 346/160; 307/311; 359/239, 323

[56] References Cited

U.S. PATENT DOCUMENTS

| | | | |
|---|---|---|---|
| 3,609,381 | 9/1971 | Hartfield | 250/225 |
| 3,780,296 | 12/1973 | Waksberg et al. | 250/205 |
| 4,369,457 | 1/1983 | Sprague | 346/160 |
| 4,631,551 | 12/1986 | Vergona | 346/108 |
| 4,667,256 | 5/1987 | Vergona | 358/302 |

Primary Examiner—David C. Nelms
Assistant Examiner—K. Shami
Attorney, Agent, or Firm—Dennis P. Monteith

[57] ABSTRACT

Compensation for space charge build-up in an electro-optic modulator device is realized by recurrently recalibrating the device. During each recalibration interval, light transmitted through the device is intercepted and converted to an electric signal which is compared to a test signal of a magnitude corresponding to light of an intensity that would be transmitted through the device in the absence of space charge. The difference between the respective magnitudes of the test signal and the electric signal serves as a bias to supplement the normal modulating drive signal until the time of next recalibration. Recurrently, but at a rate lower than the recalibration rate, the device is short circuited, while flooded with light, to eliminate space charge build-up.

9 Claims, 1 Drawing Sheet

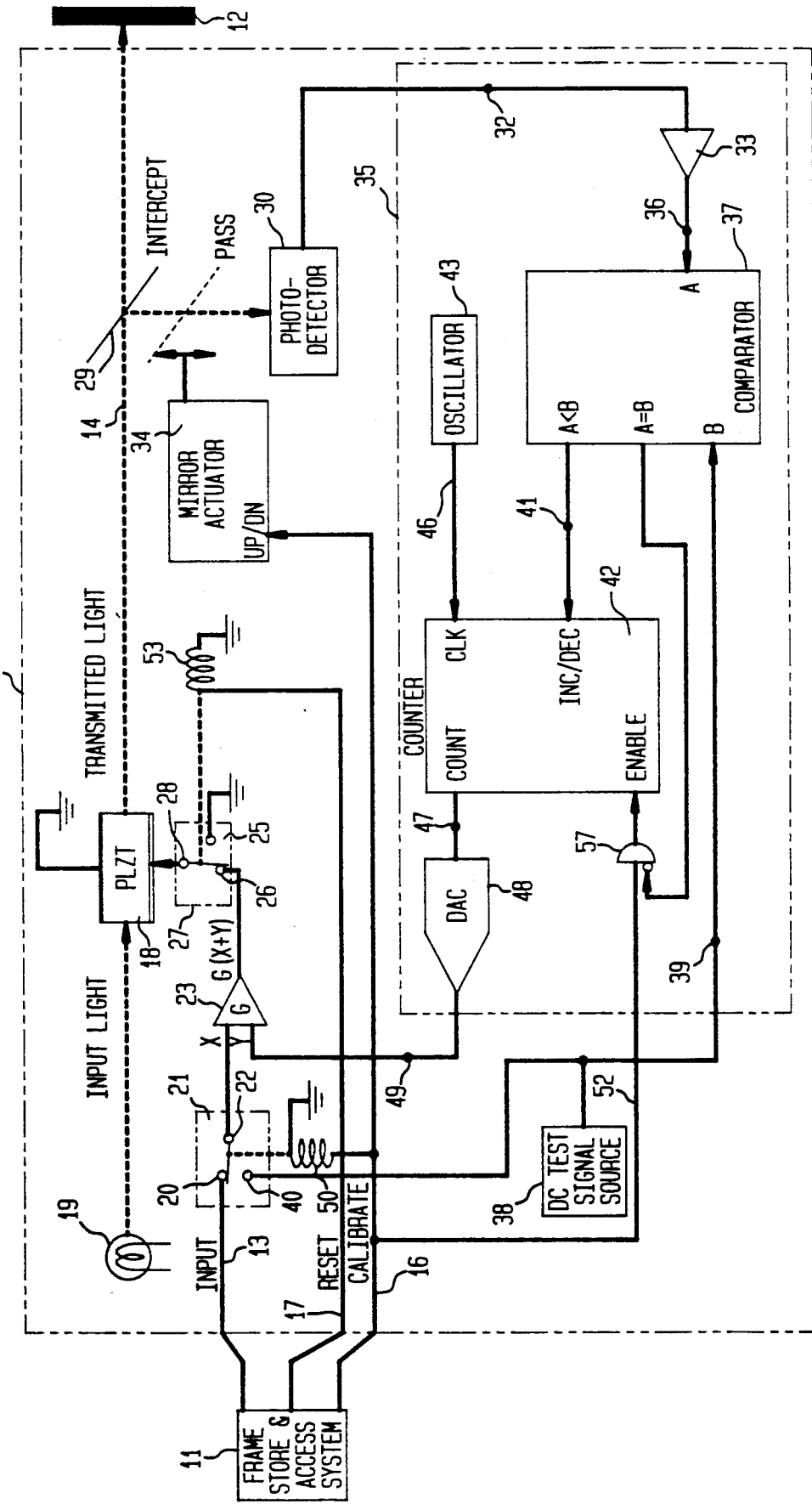

DRIFT TRACKING IN AN ELECTRO-OPTIC LIGHT MODULATOR

BACKGROUND OF THE INVENTION

1. Field of The Invention

This invention relates to light modulating systems; and it relates more particularly to providing in such systems compensation for space-charge-induced drift in the characteristics of a solid state modulation device.

2. Description Of The Prior Art

Solid state light modulating devices, sometimes called electro-optic modulators, are well known in the art. Also well known is the fact that the application of an electric drive signal to an electro-optical modulator causes, over time, the build up of space charge within the device which has the effect of partially offsetting the modulating effect of the drive voltage. That is, the growing offset causes the light transmission versus applied drive voltage characteristic of the modulator to drift. Such drift quickly becomes intolerable (e.g., in a system for exposing photographic film) because, without space charge compensation, it renders impossible the faithful reproduction of a scene that is to be reproduced.

One solution to the space charge problem has been to introduce a periodic reversal of polarity in the modulator drive voltage to prevent the build up of space charge. One example of this type of system is in the electro-optic line printer of the U.S. Pat. No. 4,369,457 to R. A. Sprague. However, sometimes spurious factors such as unbalanced duty cycle of data representing characters being printed can allow space charge to build up, in spite of the reversals, over a relatively long period of time.

Another approach to resolving the space charge problem is to employ a closed continuous feedback loop in which a portion of the modulated light transmitted by the modulator is diverted to a photodiode which converts the light intensity level to an electric signal. That signal is then used on a continuous basis to modify the modulating electrical drive signal to the modulator. Two U.S. Pat. Nos. related to this type of system are 4,631,551 and 4,667,256, both to A. B. Vergona. Although the systems disclosed in these two patents to Vergona have been found to work in their intended manner, a system employing a feedback loop of this general type suffers from two potential problems. One problem is that some modulator systems operate in a low light level range in which diversion of sufficient light to be useful in a continuous feedback network cannot be tolerated. Another problem is that the transmission characteristic of at least some solid state modulators is a sine squared function of the form:

$$T = A + B \sin^2(CV^2)$$

where T is the transmission; A, B, and C are constants related to modulator material geometry and space charge state; and V is the modulating voltage signal. A small increase in voltage can, if not carefully controlled, cause a substantial change in the frequency term, a shift in modulator operating point to a different cycle of the characteristic, and a transmission change that may not be easily predictable. Thus, continuous feedback operation can throw the device into an unstable condition unless rather sophisticated and costly circuit design precautions are adopted.

SUMMARY OF THE INVENTION

The burden of the foregoing problems is relieved by compensating a light modulator for space-charge-induced drift in transmission characteristic of an electro-optical device included in the modulator by the steps of: recurrently interrupting application of a modulating drive signal to the device to apply a predetermined test drive signal thereto; intercepting light transmitted through the device in response to application of the test drive signal; generating a calibration bias signal, in response to light from the intercepting step, having a magnitude that is indicative of the level of space charge in the device; and applying the calibration bias signal to supplement the modulating drive signal between times of the recurrent interruptions to offset at least partially the effect of the space charge on the intensity of the transmitted light.

Stated differently, space-charge-induced drift in the transmission level characteristic of a solid state electro-optic modulator device is compensated in a modulating system in which a predetermined illumination target is illuminated by a light beam projected through the device and modulated in accordance with an electric signal applied across that device. An electric modulating drive signal to the device is recurrently interrupted at a rate determined by the rate of space-charge-induced drift in modulator characteristic. During these recurrent interruptions, at least some of the light transmitted through the electro-optic device is diverted into a compensation circuit in which a calibration bias voltage is developed that is sufficient to reduce the drift. The modulated light transmission is restored, and the calibration bias voltage is applied in sum with the modulating electric signal to restore approximately the desired transmission level characteristic.

BRIEF DESCRIPTION OF THE DRAWING

The invention will be described with reference to the accompanying drawing which is a simplified block and line diagram of a light modulator system utilizing the present invention.

DETAILED DESCRIPTION OF A PREFERRED EMBODIMENT

The FIGURE of the drawing illustrates a light modulator system 10 (shown within a dashed line rectangle) utilizing the present invention for cooperating with a frame store and accessing system 11 to expose a light sensitive recording medium (i.e., an illumination target), such as photographic film 12, for recording thereon an image represented by information signals from the system 11. That system 11 schematically represents any suitable system by means of which an information database is accessed to provide signals (INPUT) for a series of pixels which together comprise an image, or frame, of previously stored image information. The image information could be that of text, a picture, or some other scene. Also provided from system 11 are CALIBRATE and RESET command signals for purposes to be hereinafter discussed in greater detail. System 11 further includes suitable means for realizing relative raster scanning motion between a modulated light beam 14 and the film 12 for appropriately sequentially exposing pixel areas of the film to record a frame of information as the pixel data are presented in the INPUT signal.

Details of the system 11 take many different forms which are well known in the art and comprise no part of the present invention.

System 11 produces on an INPUT signal lead 13 to system 10 a series of analog electric signals of various magnitudes representing pixels of an image information frame. The system 11 also produces, on correspondingly designated leads, a CALIBRATE signal on a lead 16, illustratively at the line scanning rate inherent in the pixel information provided. Depending upon the characteristics of film 12 and the rate of space-charge-induced drift in the characteristics of a modulator device (to be described), other recurrence rates (e.g., a submultiple of that line scanning rate) may also be suitable. A RESET signal is also provided on a lead 17, and its presentation is usually initiated either manually (e.g., by an operator at a command console keyboard, not separately shown) or by a control computer within system 11 between selectable frame accesses. Manual initiation is hereinafter assumed for purposes of illustration.

Light modulator system 10 employs a modulator represented by an electro-optic light modulating device (herein simply "device") 18 comprising a body of electro-optic material having electrically conductive electrodes on opposed surfaces for application of an electric drive signal to establish a modulating electric field within the electro-optic material. The field is set up in a direction which is perpendicular to the direction of propagation of light from a light source 19, through the device 18, toward the film 12. The electro-optic material used in device 18 is illustratively lanthanum-doped lead zirconate titanate (PLZT), an electro-optic material which is known to accumulate space charge when electrically driven for light modulating purposes. Light source 19 can be any appropriate source such as, e.g., an incandescent source, a laser beam source, or a xenon arc source.

Certain modulator system elements (e.g., lenses, polarizer, analyzer, filters) are to be considered to be included within the schematic representation of modulator device 18 and are not otherwise shown in the interest of drawing simplicity because they are well understood by those skilled in the art to be required but not to be of specific relevance to an understanding of the present invention. One aspect of the system which is useful for understanding the present description is that application of an electric signal to the electrodes on the electro-optic material body causes the modulator to modify correspondingly the polarization of plane polarized light propagated through the body of the modulator. When that polarization modification is effected in cooperation with appropriately oriented polarizer and analyzer, the effect is a corresponding modification of the intensity of the light transmitted in beam 14 to the film 12.

Circuitry of the modulating system 10 will now be briefly outlined before undertaking a description of its operation. The INPUT signal lead 13 is connected to a terminal 20 of a single-pole-double-throw switch 21 (shown within a dashed line rectangle) which has its armature terminal 22 connected to an X input of a summing amplifier 23. An output of amplifier 23 is connected to a terminal 26 of another single-pole-double-throw switch 27 (shown within a dashed line rectangle), which has its armature terminal 28 connected to one electrode of electro-optic modulator device 18. The other electrode of device 18 is connected to ground.

A beam 14 of modulated light transmitted from device 18 is directed to be incident upon either a target film 12 or a photo-detecting device. In the illustrative embodiment, a two-position deflecting mirror 29, when in a first (or intercept) position, intercepts light of beam 14 transmitted from device 18 toward film 12 and directs it toward a photo-detector 30. In a second (or pass) position of the mirror 29, it intercepts none of the transmitted light. It will be appreciated by those skilled in the art that other mirror arrangements are possible. For example, film 12 and photo-detector 30 could be located adjacent to one another and mirror 29 could be pivotally mounted in the path of beam 14 to be actuated between first and second positions in which it steers the beam to detector 30 or to film 12. Of course, if enough light is available in the beam 14 for proper exposure of film 12, the mirror 29 can remain continuously in its intercept position if it is partially reflective or if it is, e.g., a reflective annulus positioned to pass through its central hole a part of beam 14 and reflect the remainder of the beam to photo-detector 30.

In the drawing, photo-detector 30 is positioned to receive intercepted light reflected from the mirror 29 in its first position and has an electrical output that is connected via a node 32 to an input of a scaling amplifier 33 of a controller 35 (shown within a dashed line rectangle). The mirror is moved up or down (as illustrated) between its intercept and pass positions by a mirror actuator 34 that is controlled by the CALIBRATE signal on the aforementioned lead 16. Actuator 34 is, e.g., a solenoid having its armature attached to the mirror and mounted so that the two (up and down) positions of the solenoid define the limits of mirror travel with the upper position being the one which positions mirror 29 to intercept the modulated beam 14 from device 18.

An output of amplifier 33 is connected via a node 36 to an A input of an analog signal comparator 37. An input B of the comparator is connected to receive a predetermined test signal from an output of a direct current (DC) test signal source 38 by way of a node 39. The same output of source 38 is also connected to a terminal 40 of the switch 21.

Comparator 37 has an A<B output which is connected via a circuit node 41 to an increment/decrement (INC/DEC) input of an up/down counter 42. That counter is driven by the output of an oscillator 43 which is connected by a lead 46 to a clock (CLK) input of the counter. A bit-parallel count level output from counter 42 is connected by a set of leads [schematically represented by a single lead including a circuit node 47]to a digital signal input of a digital-to-analog converter (DAC) 48. An analog signal output from DAC 48 is connected through a circuit node 49 to a Y input of the summary amplifier 23. Comparator 37 also has an A=B output connected to an inhibiting input of a logical AND gate 57.

The CALIBRATE signal on lead 16 is also applied to one terminal of an operating coil 50 which has its other terminal grounded and which is electromagnetically coupled to operate the armature of switch 21 between its terminals 20 and 40. It will of course be appreciated by those skilled in the art that switch 21 could alternatively be a solid state switch controlled by the CALIBRATE SIGNAL. Lead 16 is also connected by a lead 52 to one input of the AND gate 57 which has its output connected to an enable input of the counter 42.

The RESET signal on lead 17 is connected to one terminal of an operating coil 53 which is electromagnetically coupled to operate the armature of switch 27 between the switch terminals 25 and 26. The other terminal of coil 53 and terminal 25 of switch 27 are interconnected to ground. Switch 27 also could be a solid state switch controlled by the RESET signal.

Considering now the operation of the modulation system 10 in the drawing, it will be assumed for illustrative purposes that drive is applied to device 18 in such a direction that if space charge were to build up in the device it would cause a reduction in intensity of modulated light in beam 14 from the level with the same drive but no space charge. During normal image-recording operation of the modulator system 10, the INPUT signal voltage level on lead 13 varies according to the pixel information to be recorded on film 12. The RESET signal on lead 17 is at a low logic level (e.g., ground); so the armature of switch 27 is closed between terminals 26 and 28; and coil 53 is not energized. The calibrate signal on lead 17 is also at a low logic level (e.g., ground) so that the actuator 34 is inactive and mirror 29 is in its withdrawn, or pass, position; and coil 50 is not energized so the armature of switch 21 is closed between terminals 20 and 22 of switch 21. Accordingly, INPUT signals on lead 13 are amplified with a gain $G = X$, assuming the Y input calibration bias initially to be zero, and applied through switch 27 to drive modulator device 18 according to the level of those INPUT signals. The normal gain G (i.e., when $Y = 0$ and there is essentially zero space charge in device 18) of amplifier 23 is established at a predetermined level such that the maximum level in the dynamic range of INPUT signals on lead 13 controls device 18 so that transmitted light incident on film 12 has maximum intensity to produce the maximum desired exposure for the type of film 12 being employed. Furthermore, since the transmission versus voltage characteristic of PLZT device 18 has a sine squared type of configuration it is in large measure nonlinear. The gain of amplifier 23 is advantageously chosen so that the maximum-intensity maximum-exposure transmission point just mentioned occurs near a maximum transmission end of an approximately linear segment between peaks of that characteristic. The signal from test signal source 38 is at its predetermined level, which will be subsequently further discussed; but it is initially ineffective because terminal 40 of switch 21 is not engaged and because counter 42 has not yet been enabled.

Recurrently (e.g., at the line scanning rate represented in the INPUT signals on lead 13) the CALIBRATE signal on lead 16 includes a pulse which goes to a high logic level, e.g., 5 volts, to initiate calibration of the PLZT device 18 in the event that space charge has begun to build up as previously described. The CALIBRATE signal is advantageously applied during the line fly-back time of the scanning sequence in which the pixel signals of INPUT were collected for the database in system 11; but it need not be applied as to every line. The CALIBRATE recurrence rate is determined by the rate of space charge build up in a particular application and by the illumination requirements for exposure, with appropriate resolution and contrast, of the film 12 to be exposed.

That high CALIBRATE signal energizes coil 50 to actuate switch 21 to open the circuit between terminals 20 and 22 and close the circuit between terminals 40 and 22 so that the test signal from source 38 replaces the INPUT signal on lead 13 as the X input to amplifier 23. The source 38 test signal is chosen to have a level which produces, after amplification in amplifier 23, a drive to device 18 which would cause transmitted light (if beam 14 were incident on film 12 instead of having been intercepted by mirror 29) to have any predetermined intensity level of particular interest in the exposure range of the film 12. That predetermined level may be at one of the extremes of the dynamic exposure range of the film, or it may be at some intermediate level at which there may be a need for particularly precise resolution—all depending upon the characteristics of the particular film being used and upon the task to be performed with that film. That predetermined intensity level is also selected for conditions of approximately zero calibration bias at the Y input to amplifier 23 and of approximately zero space charge in modulator device 18. The test signal from source 38 is also applied via node 39 to the B input of comparator 37.

Mirror actuator 34 responds to the high calibrate signal by moving the mirror 29 into its intercept position and thereby deflecting light in beam 14 transmitted from device 18 to Photo-detector 30 which converts the deflected light intensity level incident thereon into an electrical signal of corresponding magnitude. Detector 30 output is applied through node 32 to the input of amplifier 33 and from there via node 36 to the A input of comparator 37. The gain of amplifier 33 is set to a predetermined level such that for conditions of approximately zero space charge in device 18, and with the just described test signal from source 38 applied to the X input of amplifier 23, the signals at the comparator A and B inputs will be about equal. Thus, if space charge is present in device 18 at the outset of a high CALIBRATE signal, it partially offsets the modulating effect of the drive signal from amplifier 23; and the intensity of light in beam 14 is reduced. Likewise, amplifier 33 output to the A input of comparator 37 is correspondingly reduced below the level at the B input. That $A < B$ relationship causes a high logic level signal to appear at the $A < B$ output of the comparator. Since the high CALIBRATE signal from lead 16 actuates AND gate 57, the high logic level output of that gate also enables counter 42 to begin counting (in this case incrementing in response to the direction command from the $A < B$ output of the comparator) pulses from oscillator 43.

As pulses are counted, the COUNT output increases; and the analog output of DAC 48 is correspondingly increased. That analog output is the Y (calibration bias) input to amplifier 23, and the amplifier output is the amplified sum of its X and Y inputs $[G(X+Y)]$. Drive to modulator device 18 is thereby increased in a direction to compensate for the space charge, and the resulting increase in transmitted light beam 14 causes corresponding increases in the output of photo-detector 30 and amplifier 33. A corresponding decrease in the comparator 37 $A<B$ output results. When the A and B inputs to comparator 37 are approximately equal, the $A = B$ output goes high to inhibit gate 57 and thereby remove the enabling input to counter 42 and stop counting for the remainder of the CALIBRATE pulse interval and thereafter. Counter 42 retains its attained count level; so the DAC 48 output continues to hold the Y input to amplifier 23 at the same calibration bias level.

At the end of the CALIBRATE pulse interval, coil 50 is deenergized, thereby causing the armature of switch 21 to return to closure between terminals 20 and 22. Mirror actuator 34 is also deenergized so mirror 29 is restored its pass position. The INPUT signal from lead 13 is now supplemented by the calibration bias signal and applied by amplifier 23 to drive modulator device 18 once more, with the space charge effects upon the transmitted light beam 14 intensity substantially offset. During each following line flyback time in the INPUT signal, the foregoing calibration operation, with its interruption and restoration of INPUT signal to amplifier 23 and of beam 14 incidence on film 12, is repeated with such further increases in the calibration bias voltage as may be required as space charge builds up.

The recurrent interruption and restoration of INPUT signal to amplifier 23 allows the system 10 to settle after each change so that there is less opportunity for instability than there is in a continuous feedback system.

In a frame store and access system such as system 11, there is usually a relatively long idle interval between recording of successive frames; so an operator will initiate a reset operation to clear accumulated space charge from device 18 and thereby prevent possible calibration bias build-up that might put the input drive to device 18 near the upper limit of its dynamic range capabilities. When a reset command is given, system 11 provides a high logic level RESET pulse signal on lead 17. This RESET signal appears before a new CALIBRATE pulse is applied to lead 16, and it energizes coil 53 thereby actuating the armature of switch 27 to open the connection between terminals 26 and 28 and close a connection between terminal 28 and grounded terminal 25. Device 18 drive electrodes are thereby short circuited.

Since light source 19 remains active at the time of a RESET signal, the short circuited device 18 is flooded with light in the absence of a modulating drive signal during the reset pulse. Consequently, the illumination produces additional carriers in device 18 which allow the separated holes and electrons of any space charge that may be present to recombine and thereby eliminate that space charge. During the reset operation, mirror 29 remains in its pass position, but there is no film present to be exposed, and the zero drive on device 18 causes the beam 14 to have its lowest intensity.

After the end of the reset pulse time, coil 53 is deenergized to cause switch 27 to reconnect the output of amplifier 23 to the drive electrodes of device 18 to prepare for appearance of the next occurring CALIBRATE signal.

Before a new film 12 is positioned in the path of beam 14, the system operator initiates a calibration operation by causing a CALIBRATE signal pulse to be applied to lead 16. That operation proceeds as previously described except that counter 42 and DAC 48 have retained their prior high output levels so initial drive to device 18 is much higher than necessary since space charge has been removed. Thus, initially comparator 37 A input is much larger than the B input, the A<B output is negative, the A=B output is low, and the counter 42 is enabled to decrement its count level. When A and B inputs become approximately equal, the A<B output is near zero, the A=B output is high, gate 57 is inhibited, and counting stops at approximately the zero count level. The Y input to amplifier 23 is approximately zero, and modulator device 18 is driven by the unbiased INPUT signal, at least until occurrence of the next CALIBRATE pulse.

While the invention has been described in connection with a particular embodiment thereof, it will be appreciated that other embodiments, applications, and modifications which will be apparent to those skilled in the art are included within the spirit and scope of the invention. For example, other electro-optical modulator devices, besides the illustrative PLZT device, and which may be subject to accumulation of space charge, can benefit from application of periodic recalibration of the invention. Likewise, the test signal source 38 could provide a stepped ramp signal, instead of a predetermined DC signal, to facilitate space charge characterization of device 18.

What Is claimed is:

1. A method for compensating for space-charge-induced drift in transmission characteristics of an electro-optic device of a light modulator, said method comprising the steps of:
   recurrently interrupting application of a modulating drive signal to said electro-optic device to apply a predetermined test drive signal thereto in lieu of the modulating drive signal;
   intercepting light transmitted through said device in synchronism with application of the test drive signal;
   generating, in response to light from said intercepting step, a calibration bias signal having a magnitude that is indicative of the level of space charge in said device; and
   applying the calibration bias signal to supplement the modulating drive signal between times of said recurrent interruptions, thereby at least partially offsetting the effect of space charge in said device on the intensity of light transmitted through said device.

2. The method of claim 1 in which said generating step comprises the steps of:
   converting intercepted light to an electric signal of corresponding level;
   comparing the electric signal to the test drive signal, the latter signal having a magnitude approximately corresponding to transmitted light of a predetermined level in the absence of space charge in said electro-optic device; and
   developing a bias signal of sufficient magnitude to equalize approximately the electric signal and the test signal.

3. The method of claim 1 further comprising the steps of:
   recurrently, at a rate less than the rate of said interrupting step, short circuiting said electro-optic device for at least a predetermined interval; and
   illuminating said electro-optic device during the predetermined interval at a sufficient level of illumination to cause substantially all space charge in said electro-optic device to be depleted.

4. A space charge compensating system for an electro-optic light modulator used to transmit modulated light to a predetermined illumination target, said system comprising:
   a body of electro-optic material having electrically conductive electrodes for application of a variable drive signal to modulate light transmitted through said body;
   means for recurrently interrupting the variable drive signal to apply a predetermined test drive signal to said body in lieu of the variable drive signal;
   intercepting means for intercepting at least a portion of light transmitted through said body when the test drive signal is applied to said body of electro-optic material;

generating means, responsive to intercepted light from said intercepting means, for generating a calibration bias signal having a magnitude that is indicative of a level of space charge in said body of material; and means for applying the calibration bias signal to supplement the variable drive signal between times of recurrent interruptions by said interrupting means and thereby at least partially offset the effect of space charge in said electro-optic material on the level of light transmitted through said light modulator.

5. The space charge compensating system of claim 4 in which:

said intercepting means comprises a mirror and means for moving said mirror into a beam of light transmitted through said body to deflect at least a portion of the transmitted light to said generating means.

6. The space charge compensating system of claim 4 in which said applying means comprises:

a summing amplifier having a first input connection for receiving the variable drive signal and a second input connection for receiving the calibration bias signal, and said summing amplifier having a gain predetermined to fix the dynamic range of the drive signal to include at least a range sufficient to drive said body of electro-optic material to produce a predetermined full dynamic illumination intensity range of the illumination target.

7. The space charge compensating system of claim 4 in which said applying means further comprises:

resetting means for recurrently, and at a rate less than the rate of recurrent interruption, short circuiting said electrodes and flooding said body of electro-optic material with light to clear substantially all accumulated space charge from said body.

8. The space charge compensating system of claim 4 in which said generating means comprises:

photodetecting means for converting the intercepted light into an electric signal of magnitude corresponding to the intensity of the intercepted light;

scaling amplifier means for amplifying the electric signal with a predetermined gain;

means for providing a test signal having a magnitude equal to the magnitude of a drive signal required to produce transmitted light of a predetermined level in the absence of space charge in said body of electro-optic material; and means for developing the calibration bias signal with a magnitude corresponding to the difference between the magnitude of the output of said scaling amplifier and the magnitude of the test signal.

9. The space charge compensating system of claim 8 in which said developing means further comprises:

means for comparing the magnitudes of said scaling amplifier output and the test signal;

reversible counting means for counting up or down in response to the polarity of the output of said comparing means; and digital to analog converting means for converting the count of said reversible counting means into an analog signal having a magnitude equal to the magnitude represented by said counting means output, the analog signal being the calibration bias signal.

* * * * *